(12) United States Patent
Wakabayashi

(10) Patent No.: US 10,729,519 B2
(45) Date of Patent: Aug. 4, 2020

(54) DENTAL IMPLANT BOLT FASTENING STRUCTURE

(71) Applicant: HARDLOCK INDUSTRY CO., LTD., Osaka (JP)

(72) Inventor: Katsuhiko Wakabayashi, Osaka Osaka (JP)

(73) Assignee: Hardlock Industry Co., Ltd., Osaka (JP)

(*) Notice: Subject to any disclaimer, the term of this patent is extended or adjusted under 35 U.S.C. 154(b) by 48 days.

(21) Appl. No.: 15/541,961

(22) PCT Filed: Jan. 6, 2016

(86) PCT No.: PCT/JP2016/050237
§ 371 (c)(1),
(2) Date: Jul. 6, 2017

(87) PCT Pub. No.: WO2016/111312
PCT Pub. Date: Jul. 14, 2016

(65) Prior Publication Data
US 2018/0000567 A1    Jan. 4, 2018

(30) Foreign Application Priority Data
Jan. 7, 2015    (JP) .................................. 2015-001488

(51) Int. Cl.
*A61C 8/00*    (2006.01)
*F16B 39/284*   (2006.01)
(Continued)

(52) U.S. Cl.
CPC .......... *A61C 8/0068* (2013.01); *A61C 8/0022* (2013.01); *A61C 8/0048* (2013.01);
(Continued)

(58) Field of Classification Search
CPC ...... A61C 8/0068; A61C 8/0022; F16B 39/28
(Continued)

(56) References Cited

U.S. PATENT DOCUMENTS 8,915,735 B1 * 12/2014 Carlsson .............. A61C 8/0022
433/174
2013/0260339 A1  10/2013 Reddy et al.

FOREIGN PATENT DOCUMENTS

| JP | H0966065 A | 3/1997 |
| JP | 09236109 A | 9/1997 |

(Continued)

OTHER PUBLICATIONS

Machine translation of JP 2014147431 in https://worldwide.espacenet.com/?locale=en_EP retreived on May 14, 2018.*
(Continued)

*Primary Examiner* — Sean M Michalski
*Assistant Examiner* — Mirayda A Aponte
(74) *Attorney, Agent, or Firm* — Wood, Phillips, Katz, Clark & Mortimer

(57) ABSTRACT

There is provided an implant having a slack prevention function by an eccentric fitting structure. An engaging shaft 53, which is decentered with a screw shaft 52, is provided at the end of an abutment screw 5, and is engaged with an engaging hole 45 provided in the bottom of a screw hole 44, into which an abutment screw 5 is screwed, and thus, the screw shaft 52 is inclined to and eccentric from the screw hole 44. Thereby, the screw shaft 52 comes to be strongly pressed partially in a circumferential direction toward the screw hole 44, so that internal stress in the horizontal direction is accumulated on the screw shaft 52. The screw 5 is threaded with maintaining prevailing torque caused by the internal stress, which enables the screw 5 to be fastened to the right position.

5 Claims, 8 Drawing Sheets

(51) Int. Cl.
*F16B 39/28* (2006.01)
*F16B 39/12* (2006.01)
*F16B 37/12* (2006.01)

(52) U.S. Cl.
CPC ............ *F16B 39/28* (2013.01); *F16B 39/284* (2013.01); *F16B 37/125* (2013.01); *F16B 39/128* (2013.01)

(58) Field of Classification Search
USPC .................................................. 433/173–174
See application file for complete search history.

(56) References Cited

FOREIGN PATENT DOCUMENTS

| JP | 10037936 A | 2/1998 |
|---|---|---|
| JP | 2003/325552 A | 11/2003 |
| JP | 2005/270334 A | 10/2005 |
| JP | 3814344 B2 | 8/2006 |
| JP | 2010/220700 A | 10/2010 |
| JP | 2012/110922 A | 6/2012 |
| JP | 2012110922 A * | 6/2012 |
| JP | 2013/511339 A | 4/2013 |
| JP | 2014/147431 A | 8/2014 |
| JP | 2014147431 A * | 8/2014 |
| JP | 2014/168592 A | 9/2014 |

OTHER PUBLICATIONS

Sugimoto, JP 2012110922 A, machine translation of the specification. (Year: 2012).*
International Search Report dated Feb. 9, 2016.
Written Opinion dated Feb. 9, 2016.
International Preliminary Examination Report dated Apr. 11, 2016.

* cited by examiner

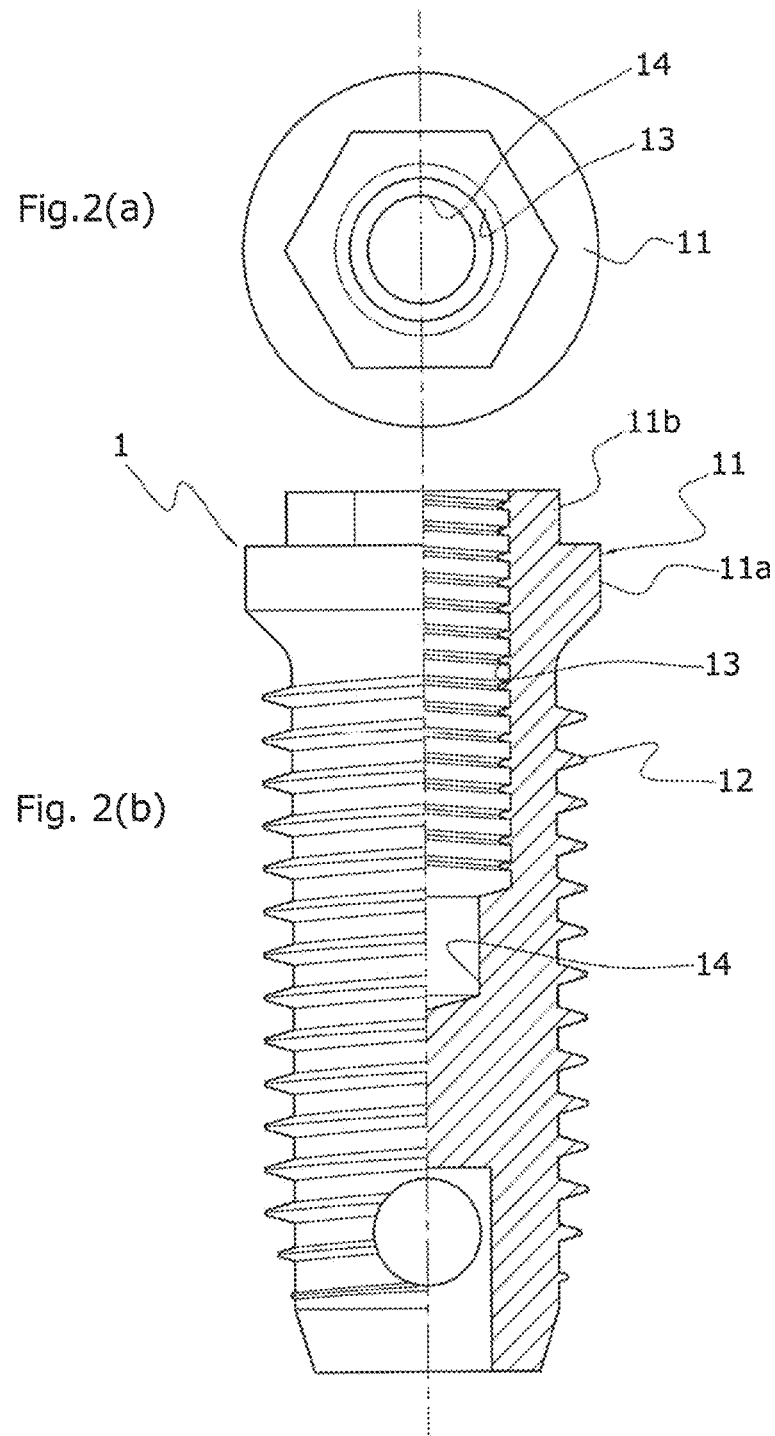

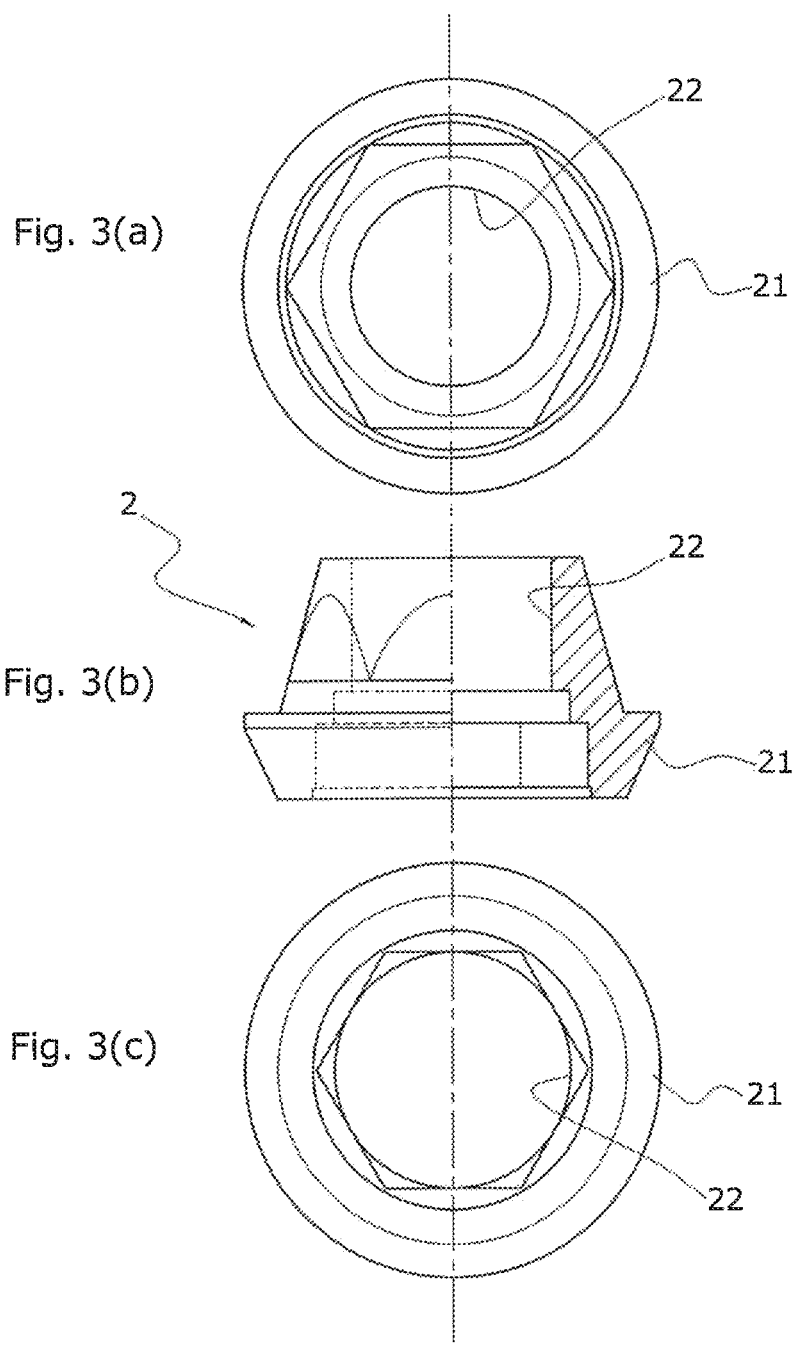

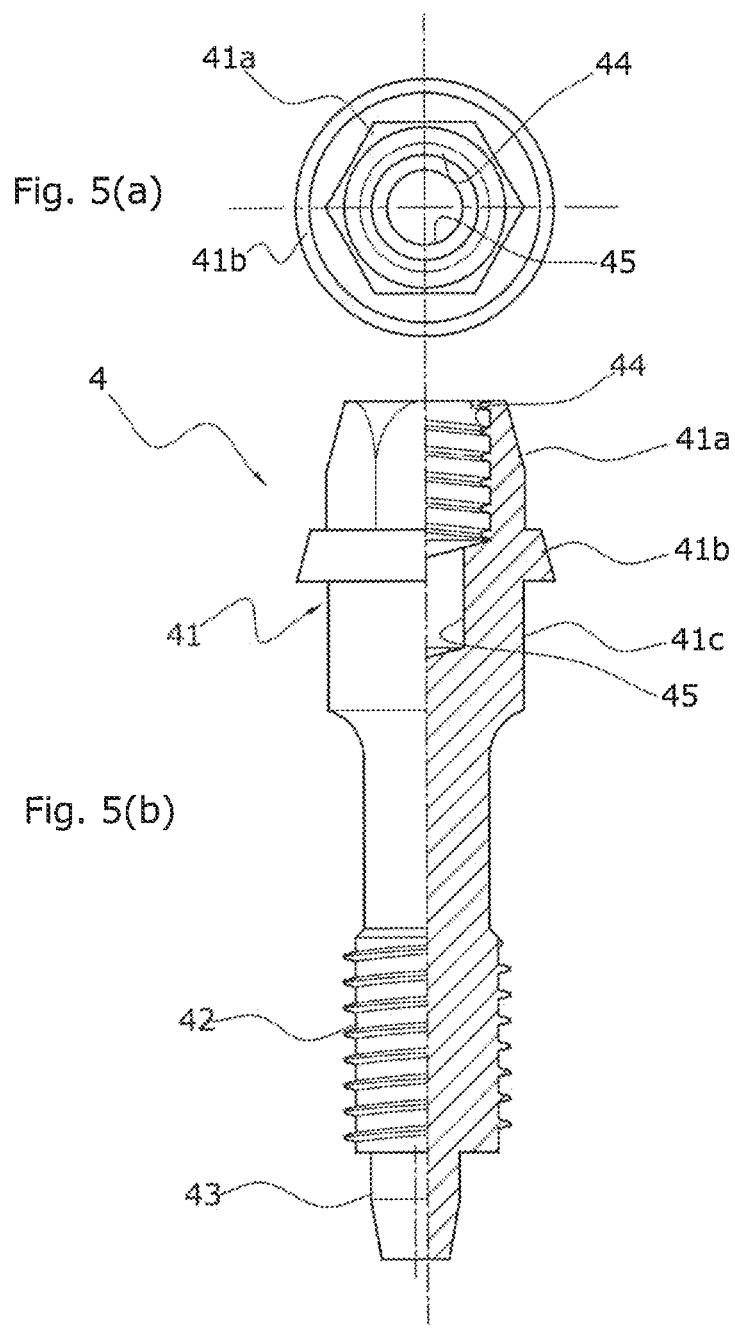

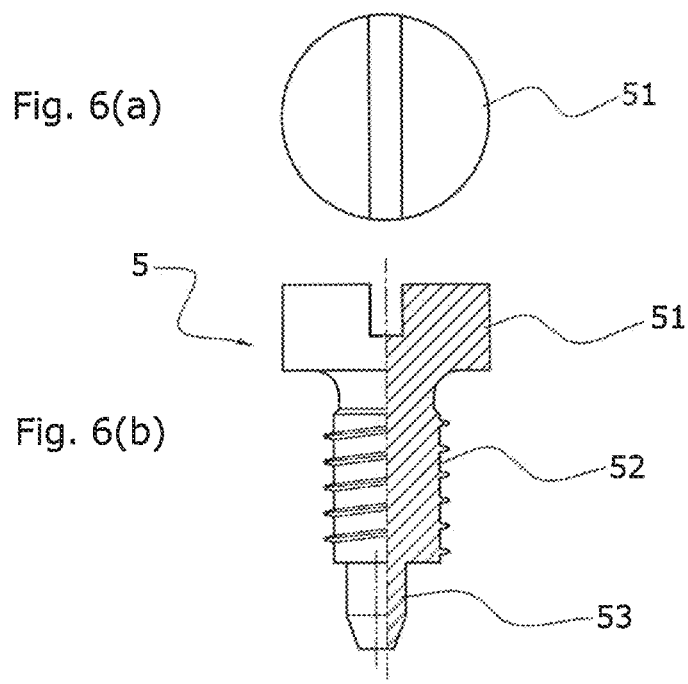

DENTAL IMPLANT BOLT FASTENING STRUCTURE

TECHNICAL FIELD

The present invention relates to bolt fastening structures having slack prevention functions and, more particularly, to bolt fastening structures suitably applicable to dental implants.

BACKGROUND ART

Recently, various dental implants (dentistry implants) have been developed for the purpose of solving the problem of tooth loss. A general implant is provided with a fixture (also called an artificial dental root or an implant body) to be embedded into a jawbone, and an upper structure, such as an abutment, to be fixed on an upper part of the fixture. As a method to fix an abutment on a fixture, such a structure is known that an abutment is fixed on a fixture by an abutment screw (a kind of bolt).

Conventionally, technology for preventing slack of an abutment screw is disclosed, for example, by the following Patent Literature 1 to 4, however, any of them is not well-proven technology as a locking structure, and has not yet popularized.

On the other hand, the present applicant manufactures and sells Hard Lock Nut (R), which can exert a slack prevention effect higher than before, and also develops locking bolts using the principle of the Hard Lock Nut, for example, one of which is disclosed by the following Patent Literature 5.

The conventional locking bolt includes: a bolt (1) having, on its end undersurface, a truncated-conical convex portion (2) or a recess; and a disc-shaped receiver (4, 4') having, on its upper surface, a recess (3) corresponding to the convex portion of the bolt or a convex portion corresponding to the recess thereof; wherein the receiver is formed to have an outside diameter approximately the same as an internal diameter of a screw hole (5) into which the bolt will be screwed, so that the receiver can be inserted or screwed into the screw hole (5); the recess and the convex portion, face-to-face, between the bolt and the receiver, are configured to be slightly off-centered relative to each other; and the receiver is located preliminarily at the correct position depending on the bolt size, and thus, contact between the inclined inner surface of the recess and the inclined side face of the convex portion increases a stress in a horizontal direction on the bolt and the receiver in the final screwing process of the bolt to generate a large horizontal stress therein, whereby a slack prevention effect is exerted.

CITATION LIST

Patent Literature

Patent Literature 1: Japanese Patent Laid-Open No. 2010-220700
Patent Literature 2: Japanese Patent Laid-Open No. 2003-325552
Patent Literature 3: Japanese Patent Laid-Open No. 2005-270334
Patent Literature 4: Japanese Patent Laid-Open No. Hei9-66065
Patent Literature 5: Japanese Patent No. 3814344

SUMMARY OF INVENTION

Technical Problem

Since remarkable achievement and great reliability have been realized for the slack prevention function by concavo-convex eccentric fitting fostered with the Hard Rock Nut, the highly reliable product can be provided if the above mentioned locking bolt adopted for a dental implant. It is difficult, however, to set a receiver at a suitable position axially in a small screw hole prepared in a fixture.

Therefore, the object of the present invention is to provide a new bolt fastening structure, which is easy to process and fix, capable of exerting a highly reliable slack prevention effect by eccentric fitting, and thus, to provide such a dental implant that slack may hardly occur with long-term use.

Solution to Problem

The present invention uses the following technical means to achieve the above object.

Namely, a bolt fastening structure of the present invention includes a base member having a screw hole and an engaging hole provided at the bottom of the screw hole, a mounting member fitted over the base member from above, and, a bolt fastening the mounting member to the base member. The screw hole is opening in an upper surface of the base member. The engaging hole has a right circular cylindrical inner surface with a diameter smaller than the internal diameter of the screw hole. The bolt has a screw shaft screwed into the screw hole and a bolt head having a larger diameter than that of the screw shaft. The bolt further has an engaging shaft which projects downward from the end undersurface of the screw shaft and engages with the inner peripheral surface of the engaging hole. The engaging shaft is slightly eccentric to the screw shaft, or the engaging hole is slightly eccentric to the screw shaft, so that the screw shaft is slightly eccentric from and/or inclined to the screw hole by engaging the engaging shaft with the engaging hole.

According to the bolt fastening structure of the present invention, when the bolt is screwed into the screw hole of the base member over which the mounting member is fitted, the engaging shaft, provided at the end of the screw shaft of the bolt, is inserted into the engaging hole in the bottom of the screw hole, and the outer peripheral surface of the engaging shaft engages with the inner peripheral surface of the engaging hole, and the screw shaft is slightly eccentric from or inclined to the screw hole in the range of looseness of the fit, and thus, the screw thread of the screw shaft is strongly pressed against the screw thread of the screw hole in a radially opposite direction of the engaging position between the engaging shaft and the engaging hole, or the bolt head is strongly pressed partially in a circumferential direction of the inner peripheral surface of its fitting hole, and thus, a certain internal stress in the horizontal direction is accumulated on the screw shaft, and also the frictional force increases to some extent at the engaging position between the engaging shaft and the inner peripheral surface of the engaging hole, which will require certain prevailing torque to rotate the bolt. In the present invention, instead of concavo-convex engagement of truncated cones, such a structure is adopted that an engaging shaft is engaged with a right circular cylindrical inner surface of an engaging hole, and that the depth of the engaging hole is made deeper than the lower end position of the engaging shaft at the time of the completion of bolt fastening, so that the bolt can be further rotated with given fastening torque greater than the above mentioned prevailing torque, and thus, the bolt can be fastened tightly to a given axial position to the base member. That is, in the present invention, such a structure is not adopted that horizontal internal stress increases greatly depending on fastening quantity, but such a structure is adopted that the bolt can be fastened with some prevailing torque maintained by eccentric fitting between the engaging shaft and the engaging hole. Therefore, the structure of the present invention can also easily be applied to small structures, such as an implant, a bolt can be fastened easily and quickly, and also the slack prevention effect can be stably exerted by the prevailing torque using the above mentioned eccentric fitting after bolt fastening. In addition, a bolt would loosen easily in the conventional structure, unless the bolt head is fastened with given fastening torque so as to be pressed against the bearing surface. Since fastening force of the fixture against an alveolar bone in a dental implant is not constant depending on the circumstances, the fixture may separate from the alveolar bone by fastening with given fastening torque, there may be necessary that the fixture is once removed and embedded again. Therefore, the fastening torque has been adjusted by practitioners based on their skill and experience. Since the present invention adopts such a structure that given prevailing torque generates at a stage before the bolt head contacts the bearing surface, appropriate setting of the eccentricity can make prevailing torque smaller than the given fastening torque in the conventional structure, and also a required slack prevention function can be generated by the prevailing torque, resulting in such a bolt fastening structure that is less likely to loosen than before, even by using given fastening torque smaller than before.

The mounting member may include a fitting hole and an engaging surface. At least a part of the bolt head may be fitting into the fitting hole. The bolt head may be engaging with the engaging surface from above. Furthermore, the fitting hole may be configured so that the bolt head starts being fitted into the fitting hole before the engaging shaft is engaged with the engaging hole, when the bolt is screwed into the screw hole of the base member over which the mounting member is fitted. Such the above structure can be realized, for example, by optimizing size setting of each part. Thereby, the inclination of the axial center of the bolt head is regulated in the range of the fit with the fitting hole, and thus, inclination of the bolt head is regulated, so that surface contact can be made almost uniformly throughout the periphery between the engaging surface and the bolt head, which enables improvement in the liquid-tightness between the bolt head and the mounting member. Therefore, for example, in the case where the structure of the present invention is used for a dental implant, it can prevent saliva and the like from flowing into the screw hole from between the bolt head and the mounting member.

Further, the engaging shaft may have a tapered surface at a peripheral edge thereof, which guides the engaging shaft to engagement with the engaging hole. Thus, even in the case where an engaging shaft overlaps the peripheral wall of an engaging hole when viewed from the axial direction, it becomes possible to easily engage the engaging shaft with an engaging hole in the fastening work process of the bolt.

It is preferred that the base member has a further engaging surface where the lower end surface of the mounting member is engaged from above, and the lower end surface of the mounting member and the engaging surface contact liquid-tightly by fastening the bolt. Thereby, in the case where the structure of the present invention is used for a dental implant, it can prevent saliva and the like from flowing into the screw hole from between the bolt head and the mounting member.

The structure of the present invention, as mentioned above, can be used for various uses, and preferably, can be used for dental implants. For example, the structure of the present invention can be applied to a dental implant by using a fixture as a base member, an abutment as a mounting member, and an abutment screw as a bolt. When there is provided an attachment to be applied to a variety of abutments between a fixture and an abutment the structure of the present invention can be applied to a dental implant by using a fixture as a base member, an attachment as a mounting member, and an attachment screw as a bolt, or the structure of the present invention can be applied to a dental implant by using an attachment screw as a base member, an abutment as a mounting member, and an abutment screw as a bolt.

Advantageous Effects of Invention

According to the present invention, there can be provided a new bolt fastening structure, which is easy to process and fix, capable of exerting a highly reliable slack prevention effect by eccentric fitting, and thus, there can be provided a dental implant having a high effect to prevent slack of a bolt, such as an abutment screw.

BRIEF DESCRIPTION OF DRAWINGS

FIGS. 2(a) and 2(b) illustrate a fixture of the implant, in which FIG. 2(a) is a plan view and FIG. 2(b) is a half-cross-sectional front view;

FIGS. 3(a), 3(b) and 3(c) illustrate an attachment of the implant, in which FIG. 3(a) is a plan view, FIG. 3(b) is a half-cross-sectional front view, and FIG. 3(c) is a bottom plan view;

FIGS. 4(a), 4(b) and 4(c) illustrate, an abutment of the implant, in which FIG. 4(a) is a plan view, FIG. 4(b) is a half-cross-sectional front view, and FIG. 4(c) is a bottom plan view;

FIGS. 5(a) and 5(b) illustrate an attachment screw of the implant, in which FIG. 5(a) is a plan view and FIG. 5(b) is a half-cross-sectional front view;

FIGS. 6(a) and 6(b) illustrate an abutment screw of the implant, in which FIG. 6(a) is a plan view and FIG. 6(b) is a half-cross-sectional front view;

DESCRIPTION OF EMBODIMENTS

Figure 1:
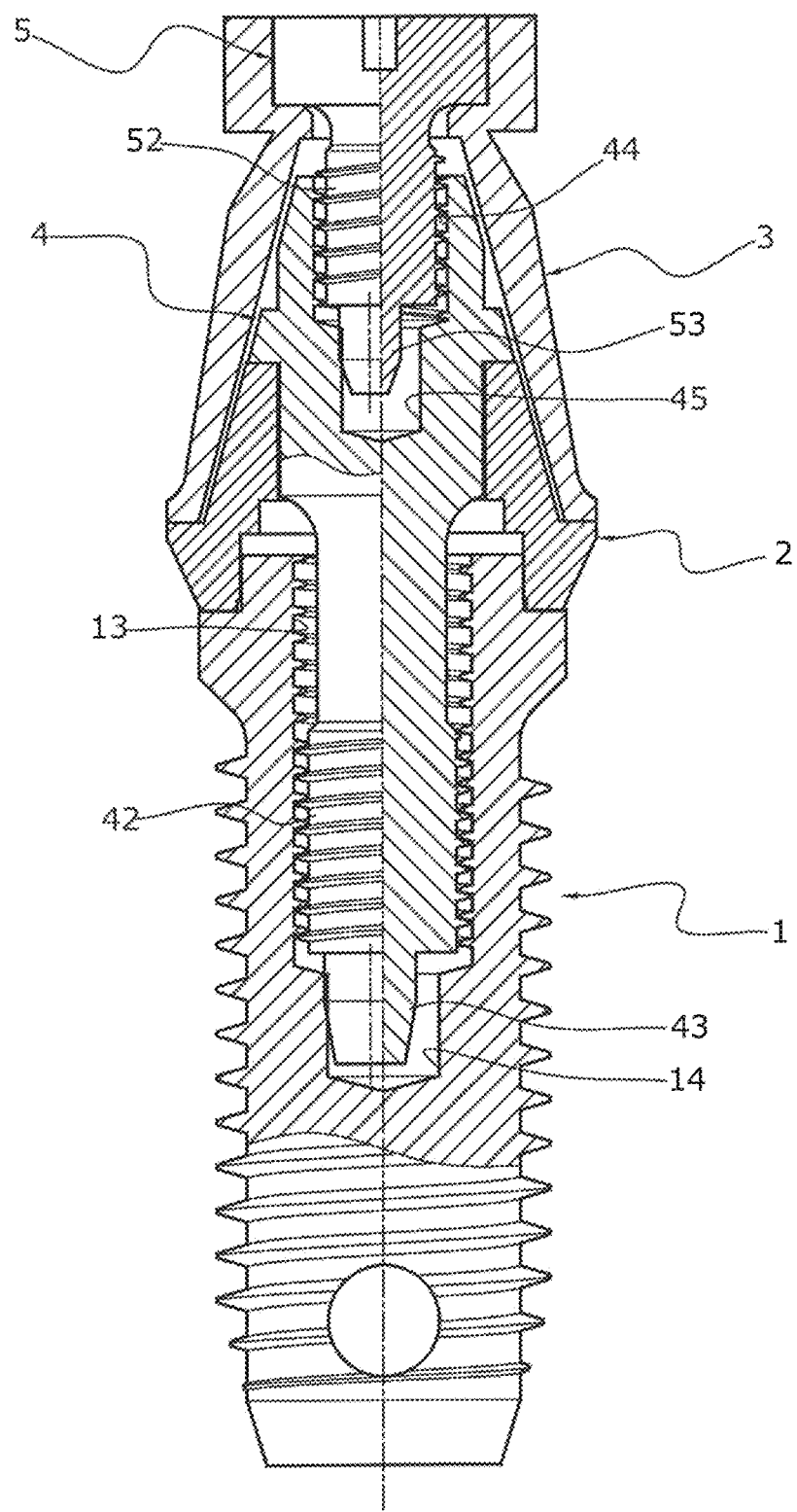
FIG. 1 is an overall cross-sectional view showing an implant in accordance with one embodiment of the present invention.

Hereinafter, an embodiment of the present invention is described based on drawings.

FIGS. 1 to 6 illustrate a dental implant having a bolt fixing structure and its component parts in accordance with one embodiment of the present invention. The dental implant includes a fixture 1 to be embedded in an alveolar bone, an abutment 3 to be attached to the top of the fixture 1 via an attachment 2, an attachment screw 4 for fixing the attachment 2 on the fixture 1, and an abutment screw 5 for attaching the abutment 3 to the attachment screw 4, wherein each of these component parts are made of, for example, titanium alloy.

The fixture 1 is a paralleled wall implant (straight implant) in an example, as shown in FIG. 2, wherein a platform 11 (bolt head) is provided on the top, and has a flange 11a and a hexagon-nut tool engaging part 11b continuously formed in an upper part of the flange 11a via a step, and a peripheral thread part 12 is provided in such a manner that the diameter is equal from the lower edge of the platform 11 to the bottom (end) of the fixture 1. A screw hole 13, which opens in the upper surface of the platform 11, is provided along the axial direction in the fixture 1, and an engaging hole 14, with an inner surface of a right circular cylinder in the bottom of the screw hole 13, is provided, wherein a circular cross section of the engaging hole 14 has a diameter smaller than the internal diameter (female thread diameter) of the screw hole 13. The engaging hole 14 is provided concentrically with the screw hole 13.

The attachment 2 is an approximately truncated cone cylinder, as shown in FIG. 3, wherein, at the bottom thereof, there is provided a fitting part 21, in the shape of an inverted truncated cone cylinder, to be fitted over the tool engaging part 11b of the platform 11 of the fixture 1. The undersurface of the fitting part 21 comes into contact with the upper surface of the step of the platform 11 of the fixture 1 from above, and also comes into surface contact with the whole periphery thereof liquid-tightly. In the inner circumference of the attachment 2 above the fitting part 21, a fitting hole 22, having a cylindrical inner peripheral surface, into which a fitting shaft of the attachment screw 4 fits, is configured to pass through vertically.

The attachment screw 4 is a bolt, which fixes the attachment 2 (mounting member) on the fixture 1 (base member) and, as shown in FIG. 5, is integrally provided with: a bolt head 41, which is made up of a hexagon-nut tool engaging part 41a, a flange 41b, and a pillar fitting shaft 41c, continuously; a screw shaft 42, which is extended in a lower part from the bolt head 41 and is screwed into the screw hole 13 of the fixture 1; and an engaging shaft 43, which is extended in a lower part from the lower end surface of the screw shaft 42 and is inserted into the engaging hole 14 of the fixture 1 and is engaged with an inner peripheral surface thereof, wherein a tapered surface 43a, which facilitates engagement of the engaging shaft 43 to an engaging hole 14, is provided in the periphery of the lower end surface of the engaging shaft 43.

The screw shaft 42 is configured to be slightly eccentric from and inclined to the screw hole 13, when the engaging shaft 43, which is slightly eccentric from the screw shaft 42, is engaged with the engaging hole 14 of the fixture 1. In this embodiment, the fitting shaft 41c fits into the fitting hole 22 of the attachment 2, which regulates the inclination and the horizontal position shift of the bolt head 41, and allows an inclination and a horizontal position shift of the attachment screw 4 to be in a narrow range (for example, less than 0.1 mm) of the fit between the fitting shaft 41c and the fitting hole 22, and thus, the screw shaft 42 is eccentric from or inclined to the screw hole 13 just depending on such an inclination or such a horizontal position shift, whereby the screw thread of the screw shaft 42 comes to be strongly pressed partially in a circumferential direction toward the screw thread of the screw hole 13, or the fitting shaft 41c of the bolt head 41 comes to be strongly pressed partially in a circumferential direction of the inner peripheral surface of the fitting hole 22, and thus, internal stress in the horizontal direction is accumulated on the screw shaft 42 as a whole. In the state where the engaging shaft 43 is engaged with the engaging hole 14, it is possible to screw forward the screw 4 with prevailing torque kept substantially constant, which enables the screw 4 to be fastened to the right position.

The flange 41b of the attachment screw 4 comes into contact and fitted with the top surface of the attachment 2 liquid-tightly and also has a tapered outer peripheral surface, which becomes flush with the outer peripheral surface of the attachment 2.

The bolt head 41 of the attachment screw 4 includes a screw hole 44, with an open in the upper surface thereof, provided along the axial direction, and an engaging hole 45, with an inner surface of a right circular cylinder in the bottom of the screw hole 44, wherein a circular cross section of the engaging hole 45 has a diameter smaller than the internal diameter (female thread diameter) of the screw hole 44. The engaging hole 45 is concentrically provided with the screw hole 44.

Figure 4A:
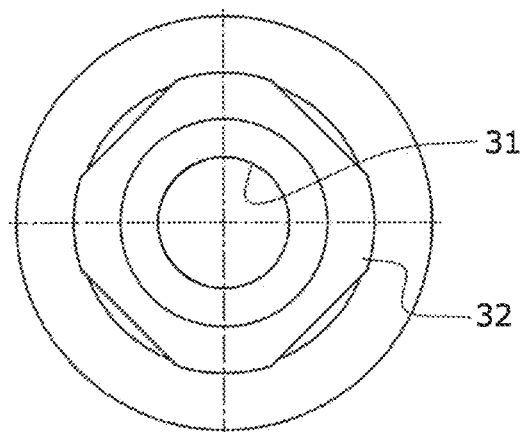
Figure 4B:
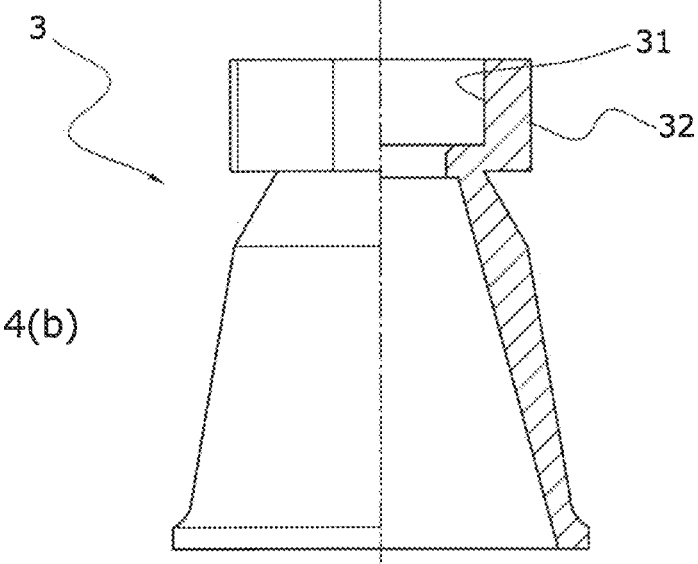
Figure 4C:
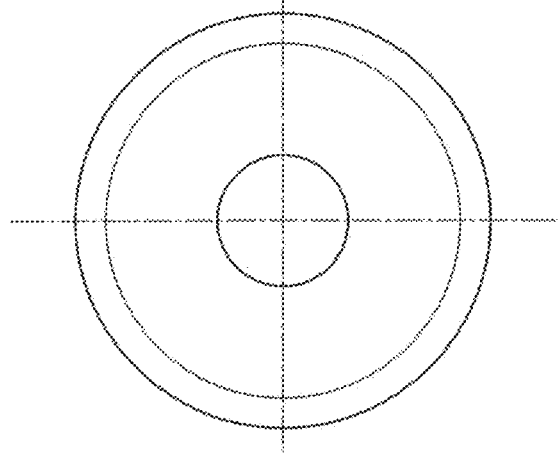
Figure 7:
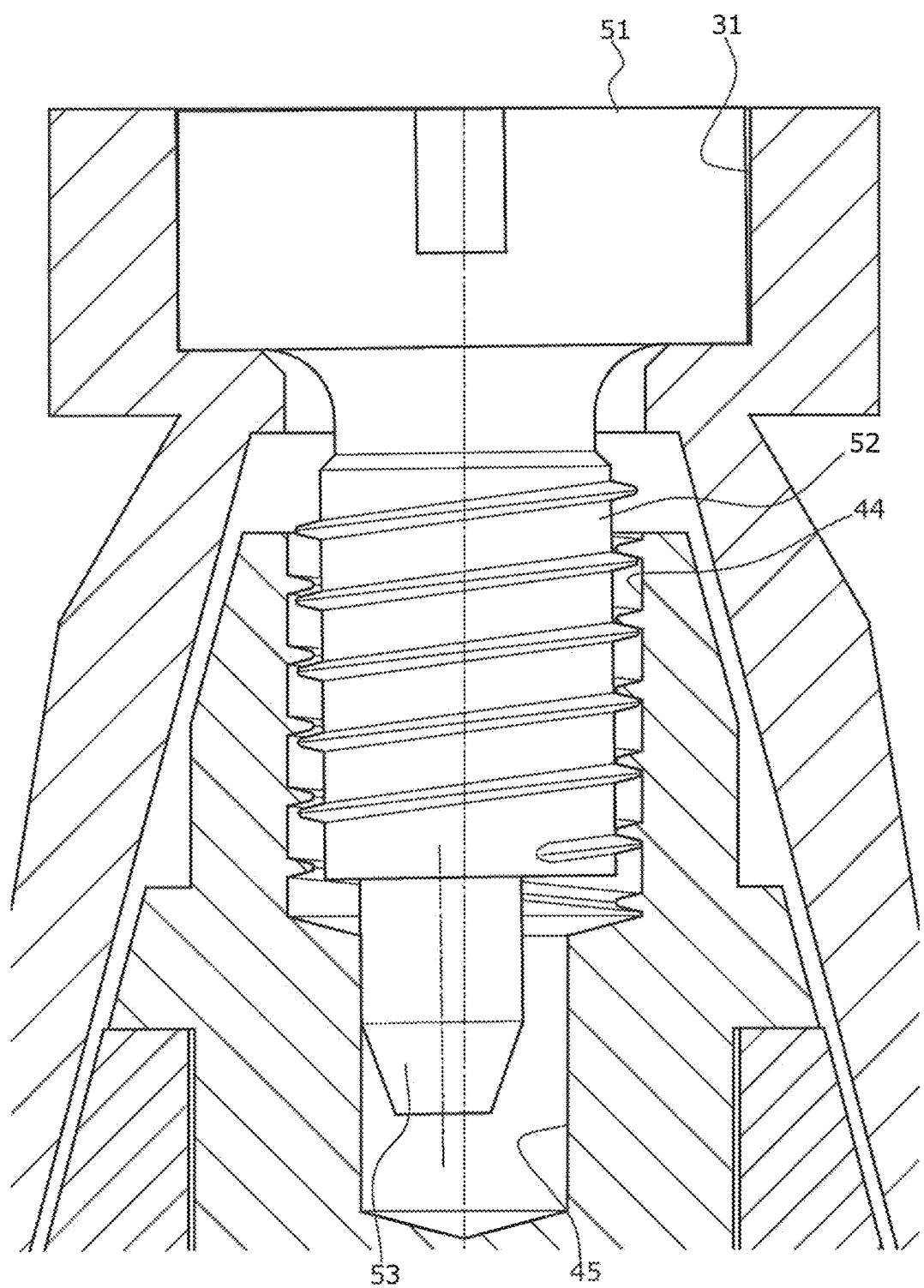
FIG. 7 is an enlarged cross-sectional view of a bolt fastening structure part for fixing the abutment.

The abutment 3, as shown in FIG. 4, is a tapered cylindrical member, which covers the attachment 2 and the attachment screw 4, and its lower end surface comes into tact and fitted with the upper surface of the fitting part 21 of the attachment 2 liquid-tightly throughout the periphery. The abutment 3 includes a crown fixing part 32 on the top thereof wherein the inner circumference is made into a fitting hole 31, into which the bolt head 51 of the abutment screw 5 is fitted. The outer peripheral surface of the crown fixing part 32 is chamfered to be shaped into an approximately square shape.

The abutment screw 5 is a bolt, which fixes the abutment 3 (mounting member) on the attachment 2 and the attachment screw 4 (base member), and, as shown in FIG. 6, includes: a cylindrical bolt head 51 having a tool engaging groove for engaging a tool, such as a slotted screwdriver, on its upper surface; a screw shaft 52, which is continuously provided downwardly from the undersurface of the bolt head 51; and an engaging shaft 53, which is continuously provided downwardly from the lower end surface of the screw shaft 52. The screw shaft 52 is configured to be slightly eccentric from and inclined to the screw hole 44, when the engaging shaft 53, which is slightly eccentric from the screw shaft 52, is engaged with the engaging hole 45 of attachment screw 4. Eccentricity of the engaging shaft 53 from the screw shaft 52 may be the same level as the fit between the screw hole 44 and the screw shaft 52 (the clearance between the screw thread top of the screw shaft 52 and the screw thread root of the screw hole 44 in the case where the screw hole 44 and the screw shaft 52 are concentric). In this embodiment, the bolt head 51 fits into the fitting hole 31 of the abutment 3, which regulates the inclination and the horizontal position shift of the bolt head 51, and allows the inclination and the horizontal position shift of the abutment screw 5 to be in a narrow range (for example, less than 0.1 mm) of the fit between the bolt head 51 and the fitting hole 31, and thus, the screw shaft 52 is eccentric from or inclined to the screw hole 44 just depending on the inclination or the horizontal position shift, whereby the screw thread of the screw shaft 52 comes to be strongly pressed partially (the right side in the figure) in a circumferential direction toward the screw thread of the screw hole 44 while the screw thread of the screw shaft 52 comes to separate from the screw thread of the screw hole 44 at the other side (the left side in the figure) in a circumferential direction, so that internal stress in the horizontal direction is accumulated on the screw shaft 52. In the state where the engaging shaft 53 is engaged with the engaging hole 45, it is possible to thread the screw 5 with prevailing torque maintained substantially constant, which enables the screw 5 to be fastened to the right position.

According to the implant of this embodiment, the bolt fastening structure of the present invention is used for fixing the attachment 2 on the fixture 1, and for fixing abutment 3 on the attachment 2 and the attachment screw 4, and thus each screw 4, 5 may hardly loosen in both fastening structures of the attachment 2 and the abutment 3, so that such an implant that slack is not easily caused for years can be provided. The depth of each engaging hole 14, 45 is made deeper than the lower end position of the engaging shaft 43, 53, respectively, at the time of the completion of fastening each screw 4, 5, and thus, each screw 4, 5 can be fastened, respectively, until the contact surfaces of the fixture 1 and the attachment 2 are pressed tightly, and until the contact surfaces of the attachment 2 and the abutment 3 are pressed tightly.

Figure 8:
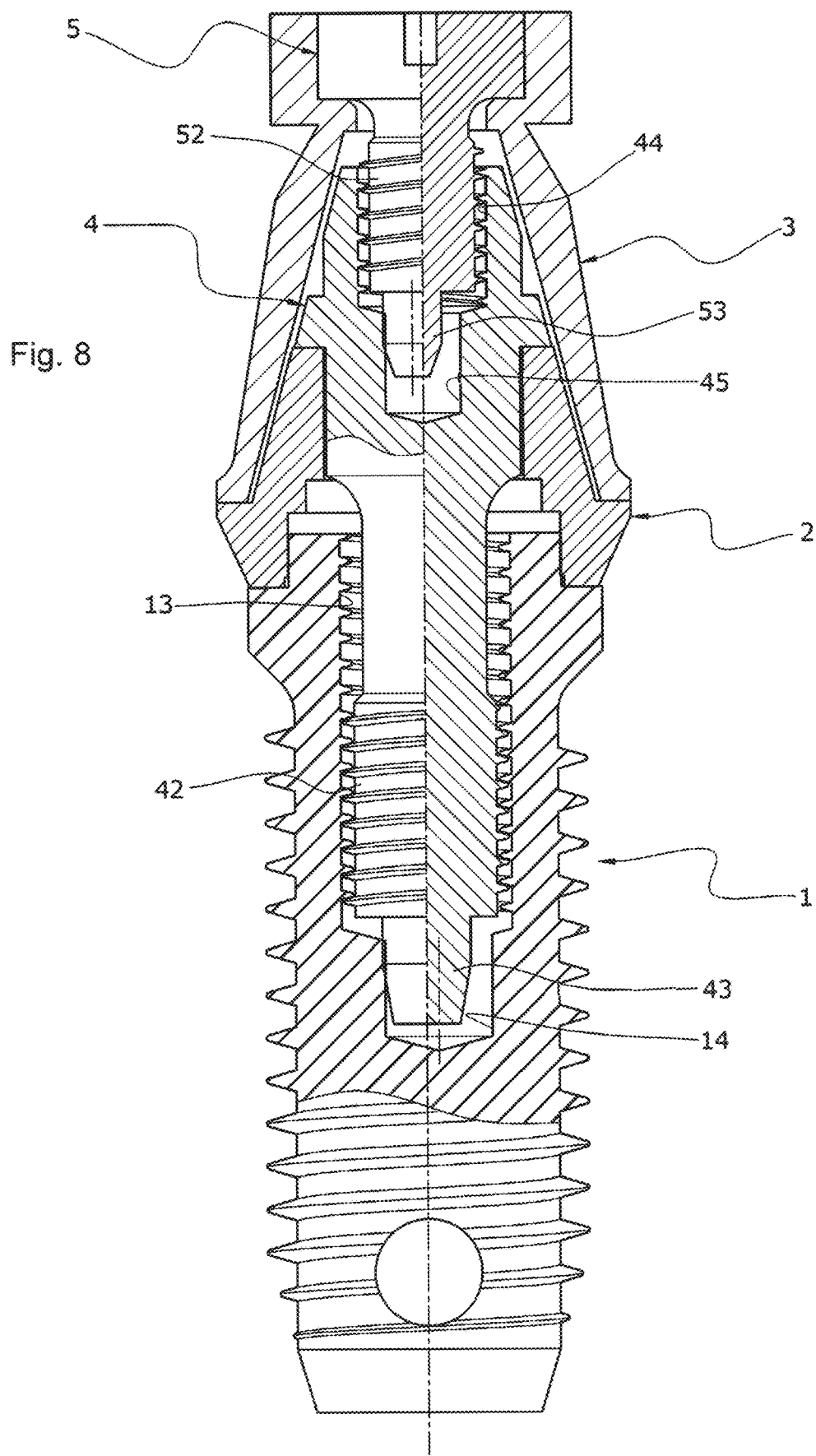
FIG. 8 is an overall cross-sectional view showing an implant in accordance with another embodiment of the present invention.

FIG. 8 illustrates another structure incorporating aspects of the invention, wherein the engaging hole 14 is eccentric to the screw shaft 42.

The present invention is not limited to the above mentioned embodiment, and the design may be changed appropriately. Although the engaging shaft was eccentric to the screw shaft, for example, in the above mentioned embodiment, even if an engaging hole at a base member side is decentered with respect to a screw hole, the equivalent slack prevention effect can be exhibited.

The invention claimed is:

1. A bolt fastening structure comprising:
a base member having a screw hole and an engaging hole provided at the bottom of the screw hole, the screw hole extending through an upper surface of the base member, and, the engaging hole having a cylindrical inner surface with a diameter smaller than the internal diameter of the screw hole;
a mounting member fitted over the base member from above; and
a bolt fastening the mounting member to the base member, the bolt having a screw shaft screwed into the screw hole and a bolt head having a larger diameter than that of the screw shaft;
characterized in that the bolt further having an engaging shaft which projects downward from an end undersurface of the screw shaft and engages with the cylindrical inner surface of the engaging hole;
wherein the engaging shaft is eccentric to the screw shaft, or the engaging hole is eccentric to the screw shaft, so that the screw shaft is eccentric from and inclined to the screw hole by engaging the engaging shaft with the cylindrical inner surface of the engaging hole; and;
wherein the engaging shaft and the engaging hole are configured to continuously and uniformly engage with each other as within the range of looseness of the fit to provide a constant prevailing torque.

2. The bolt fastening structure according to claim 1, wherein the mounting member comprises a fitting hole and an engaging surface, at least a part of the bolt head fitting into the fitting hole, the bolt head engaging with the engaging surface from above, and, the fitting hole is configured so that the bolt head starts being fitted into the fitting hole before the engaging shaft is engaged with the engaging hole, when the bolt is screwed into the screw hole of the base member over which the mounting member is fitted.

3. The bolt fastening structure according to claim 1, wherein the engaging shaft has a tapered surface at a peripheral edge thereof, which guides the engaging shaft to engagement with the engaging hole.

4. The bolt fastening structure according to claim 1, wherein the base member has a further engaging surface where the mounting member has a lower end surface engaged from above, and the lower end surface of the mounting member and the engaging surface contact liquid-tightly by fastening the bolt.

5. The bolt fastening structure according to claim 1, wherein said engaging shaft includes a cylindrical portion which engages with a cylindrical portion of the engaging hole within the range of looseness of the fit, and said engaging shaft portion has a first constant diameter and said engaging hole portion has a second constant diameter greater than said first constant diameter.

* * * * *